L. W. Kimball.
Paper Moulding.
N° 85,312. Patented Dec. 29, 1868.

Witnesses.
J. H. Burridge
W. H. Burridge

Inventor.
L. W. Kimball

UNITED STATES PATENT OFFICE.

L. W. KIMBALL, OF PITTSFORD, VERMONT.

IMPROVED MOLDING, CORNICE, AND THE LIKE FROM PAPER.

Specification forming part of Letters Patent No. 85,312, dated December 29, 1868.

*To all whom it may concern:*

Be it known that I, L. W. KIMBALL, of Pittsford, in the county of Rutland, State of Vermont, have invented certain new and useful Improvements in Paper Moldings, Cornices, &c.; and I do hereby declare that the following is a full and complete description of the same, reference being had to the accompanying drawings, making a part of this specification, in which—

Figure 1:
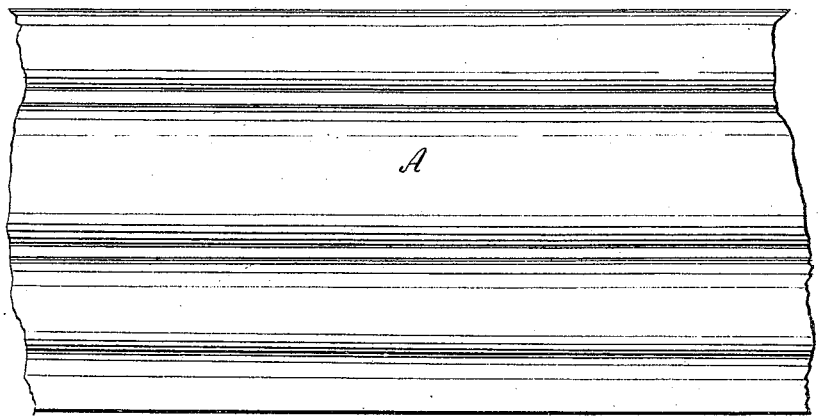
Figure 2:
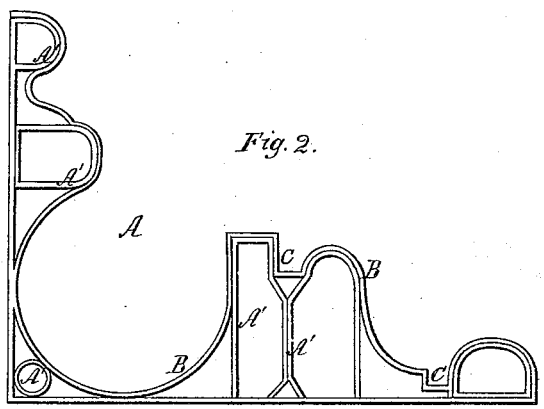
Figure 3:
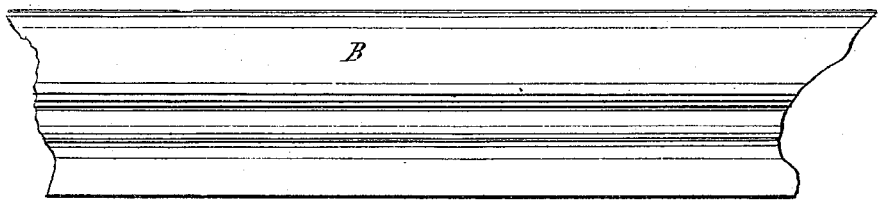
Figure 4:
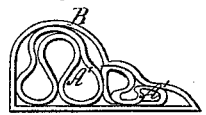
Figure 5:
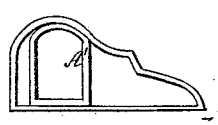

Figure 1 is a view of the face of a piece of molding; Fig. 2, an end view. Fig. 3 is also a view of a piece of molding. Figs. 4 and 5 are end views.

Like letters of reference refer to like parts in the several views presented.

The nature of this invention relates to the manufacture of moldings, cornice-work, &c., of paper, and in such way that the heavy or large parts of the moldings are hollow, and braced by an internal arrangement of arches, so the moldings, &c., are not only light, strong, and durable, but are much less expensive than those made of the ordinary materials, as plaster, &c., the same being an improvement of a former patent granted to me August 11, 1868, said patent being for the construction of door-panels, partitions, &c., whereas this invention is for the application of the same principle to moldings and cornices.

A, Fig. 1, represents a piece of molding of a composite order, which, as will be seen, is made of straw paper or board. One or more thicknesses of board are pressed into a mold corresponding to the style or orders of which the cornice or molding is composed.

The sheets, before they are laid upon each other, are spread over with a preparation of glue or other adhesive material, so that they will adhere and become solid.

If the design of the work is composed of different members, and represented with bold figures and angles B C, and also of large size, as shown in Fig. 1, the reverse or followers are made in sections, and put together by joining the several members to each other in their proper order.

The large hollow sections are braced by an internal arrangement of braces, A', Fig. 2; also represented in Figs. 4 and 5. By this means the members are strengthened, without greatly adding to their weight.

The braces are put in when the back is put on, all the work being done under pressure, and, as aforesaid, is for the inside finish of buildings requiring ornamental moldings, which are usually made of wood, plaster, and sometimes of sheet metal, all of which is expensive; and such as are made of plaster are very liable to crack and crumble down, in consequence of the absorption of moisture, whereas those made of paper are less expensive, lighter, and more durable.

What I claim as my invention, and desire to secure by Letters Patent, is—

The molding or cornice A, when constructed of paper, provided with internal braces or stays A', in the manner substantially as and for the purpose specified, as a new article of manufacture.

L. W. KIMBALL.

Witnesses:
R. N. ALLEN,
S. H. KELLOGG.